United States Patent [19]
Crisafulli et al.

[11] Patent Number: 5,376,925
[45] Date of Patent: Dec. 27, 1994

[54] MOTION AND DIRECTION SENSORS

[75] Inventors: Donald M. Crisafulli; Jayaram A. Grama, both of Montgomery County, Md.

[73] Assignee: Pulse Electronics, Inc., Rockville, Md.

[21] Appl. No.: 964,432

[22] Filed: Oct. 21, 1992

[51] Int. Cl.$^5$ .................. G08B 21/00; G08C 19/00; B61L 3/00; G01D 18/00
[52] U.S. Cl. ..................... 340/665; 340/669; 340/683; 340/870.30; 33/366; 73/651; 246/167 R; 246/182 R; 310/318
[58] Field of Search ............... 340/683, 682, 619, 665, 340/669, 670, 870.30; 310/318, 338, 339, 319; 246/167 R, 182 R, 169 R, 218, 270 R, 359; 73/862.46, 488, 651, 652; 33/366, 573

[56] References Cited

U.S. PATENT DOCUMENTS

| | | | |
|---|---|---|---|
| 4,279,159 | 7/1981 | Powell et al. | 73/651 |
| 4,379,404 | 4/1983 | Hamisch et al. | 73/651 |
| 4,441,103 | 4/1984 | Urabe | 340/683 |
| 5,003,824 | 4/1991 | Fukada et al. | 73/651 |
| 5,016,840 | 5/1991 | Bezos | 246/167 R |
| 5,065,522 | 11/1991 | Motoda et al. | 33/366 |
| 5,084,696 | 1/1992 | Guscott et al. | 340/511 |

*Primary Examiner*—John K. Peng
*Assistant Examiner*—Daniel J. Wu
*Attorney, Agent, or Firm*—Whitham, Curtis, Whitham & McGinn

[57] ABSTRACT

Motion and direction sensors for end of train (EOT) telemetry equipment employ a piezoelectric film as the sensing element. The motion sensor has a mechanical design which is optimized for detecting vibration on a railroad car. The electrical circuitry of the motion sensor generates output pulses to the EOT microprocessor which are processed according to an algorithm to make a determination of train motion based on detected vibration levels and rates of occurrence. Also, the EOT microprocessor dynamically adjusts the sensitivity of the motion sensor as a function of detected motion. The direction sensor uses a pendulum aligned with the axis of train motion to stress the piezoelectric film and, like the motion sensor, generates output pulses to the EOT microprocessor. These pulses are processed by a direction sensing algorithm implemented on the EOT microprocessor to determine the direction of train motion.

19 Claims, 9 Drawing Sheets

MOTION AND DIRECTION SENSORS

BACKGROUND OF THE INVENTION

1. Field of the Invention

The present invention generally relates to improvements in motion and direction sensors and, more particularly, to motion and direction sensors having particular application in End of Train (EOT) railroad telemetry systems.

2. Description of the Prior Art

End of Train (EOT) signalling and monitoring equipment is now widely used, in place of cabooses, to meet operating and safety requirements of railroads. The information monitored by the EOT unit typically includes the air pressure of the brake line, battery condition, marker light operation, and train movement. This information is transmitted to the crew in the locomotive by a battery powered telemetry transmitter. In addition, the EOT unit typically includes a marker light mounted a specific height above the track and having a well defined beam pattern.

The original EOT telemetry systems were one way systems; that is, data was periodically transmitted from the EOT unit to the Head of Train (HOT) unit in the locomotive where the information was displayed. More recently, two way systems have been introduced wherein radio transmissions are also made by the HOT unit to the EOT unit. In one specific application, the EOT unit controls an air valve in the brake line which can be operated by a transmission from the HOT unit.

With the continuing development of EOT units for use in two-way railroad telemetry systems, one goal has been to improve the functionality of the existing motion sensor. This sensor had been reported as not working properly under certain conditions, primarily when operated on smooth rail. In addition, the existing sensor does not report direction of motion, which is now a requirement for certain railroad customers. However, since all railroads require motion reporting to the HOT unit, but only a few require direction reporting, separate motion and direction sensors were developed. Since the motion and direction sensors function independently of each other, this approach minimizes cost, size and complexity for those customers not requiring the direction sensor.

SUMMARY OF THE INVENTION

It is therefore an object of the present invention to provide an improved and more reliable motion detector for use in railroad EOT telemetry systems.

It is another object of the invention to provide a direction sensor for EOT telemetry systems which reports direction of motion to the HOT unit.

According to the invention, there are provided separate and independent motion and direction sensors which employ a piezoelectric film as the sensing element. The motion sensor has a mechanical design which is optimized for detecting vibration on a railroad car. The electrical circuitry of the motion sensor generates output pulses to the EOT microprocessor in response to motion-generated vibration signals. The direction sensor uses a direction-sensitive pendulum to stress the piezoelectric film and, like the motion sensor, generates output pulses to the EOT microprocessor. The EOT microprocessor makes a determination of motion detection based on the input pulses from the motion sensor using the motion sensing algorithm, and separately makes a determination of direction of motion based on the input pulses from the direction sensor using a direction sensing algorithm also implemented on the microprocessor. The EOT microprocessor dynamically adjusts the sensitivity of the motion sensor as a function of detected motion signal transitions. For the direction sensor, threshold sensitivity is selectable to one of two levels, but it is not dynamically adjusted during train operation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
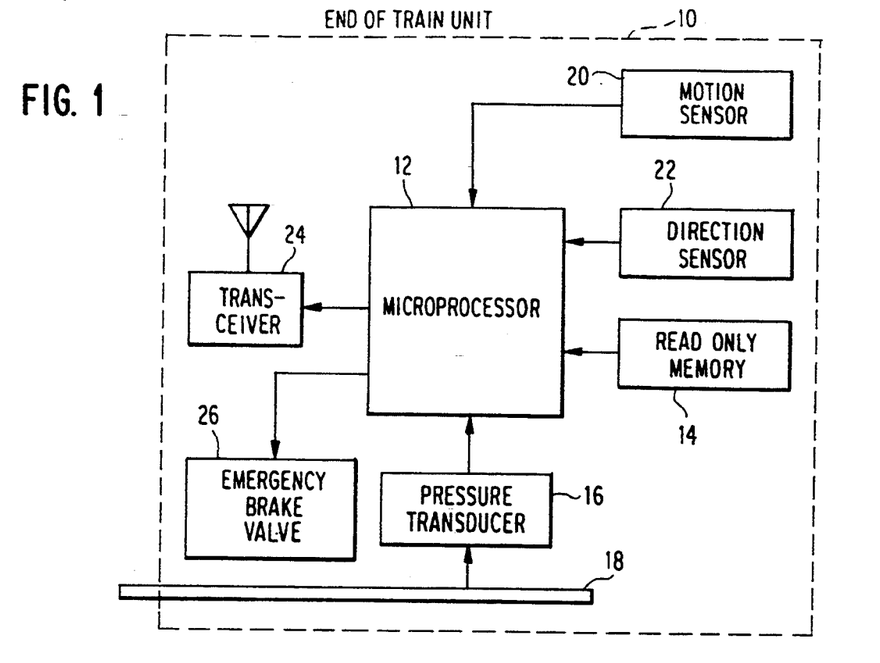
FIG. 1 is a block diagram of the two-way EOT unit showing the relationship of the motion and direction sensors to the EOT microprocessor.

Referring now to the drawings, and more particularly to FIG. 1, there is shown in block diagram form the principal components of the two-way EOT unit 10 incorporating the improved motion and direction sensors according to the invention. The EOT unit 10 is controlled by a microprocessor 12 having read only memory (ROM) 14 in which the control program for the microprocessor is stored. These include the program modules which implement the motion sensing and direction sensing algorithms described in more detail hereinafter and illustrated in FIGS. 9 and 10 of the drawings. The microprocessor 12 receives an input from pressure transducer 16 connected to the air brake pipe 18 of the train. Inputs are also received by the microprocessor 12 from the motion sensor 20 and the direction sensor 22. These inputs are processed by the microprocessor according to the control program stored in ROM 14, and the resulting data is formatted for transmission via a radio transceiver 24 to the HOT unit (not shown) for display in the locomotive cab. In addition, the HOT unit can transmit to the EOT unit. Such transmissions are received by the transceiver 24 and input to the microprocessor 12. One type of transmission from the HOT unit to the EOT unit is an emergency brake command, which, when received, instructs the microprocessor 12 to open the emergency brake valve 26 thereby venting air from the brake pipe 18 to atmosphere.

Figures 2, 3:
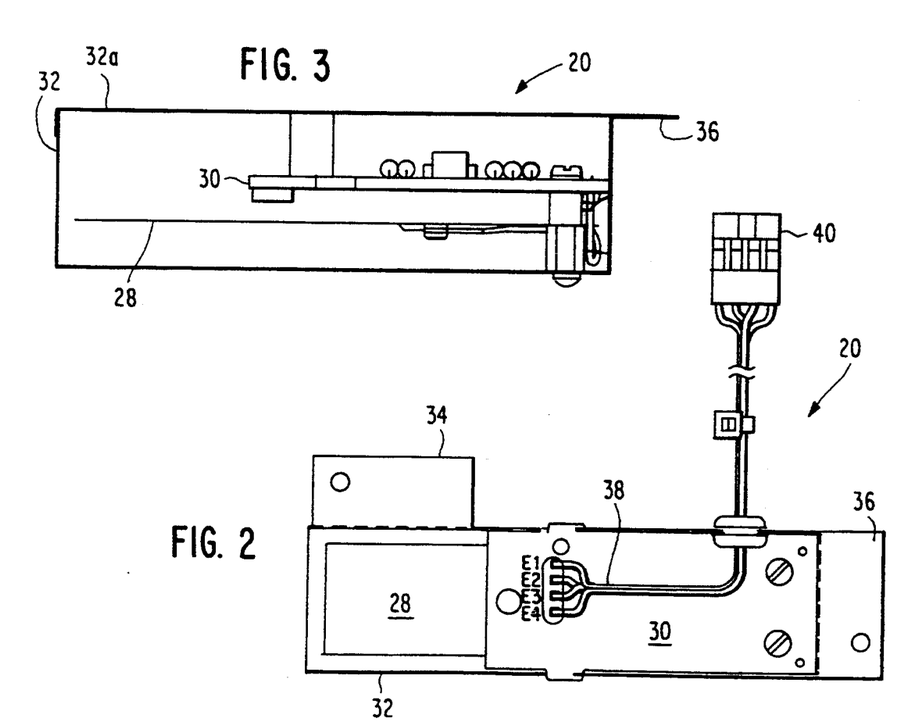
FIG. 2 is a top view, with the top cover removed, of the motion sensor according to the invention.
FIG. 3 is a side view, partially in section, of the motion sensor according to the invention.

FIGS. 2 and 3 show the mechanical design of the motion sensor 20. A cantilevered beam 28, fabricated from 0.005 inch thick by 0.68 inch wide and 3.0 inch long phosphor bronze, is attached at one end to the printed circuit board 30 containing the electronic circuitry of the motion sensor. Based on package size limitations, the beam dimensions are chosen to make the beam alone resonant at approximately 14 Hz. After the piezoelectric film used as the sensing element is attached to the beam, the resonant frequency of the combination increases to approximately 20 Hz. However, due to the extremely high sensitivity of the piezoelectric film, this higher resonant frequency is acceptable. The guidelines of this design were test data measuring acceleration forces on railroad car bodies operated over test track at the American Association of Railroads (AAR) Transportation Test Center in Pueblo, Colo. In general, the test data show that vertical vibration power spectral densities peak in the 10 to 15 Hz range with the peak shifting to higher frequencies at higher train speeds.

As indicated above, the sensing material used in the preferred embodiment of the invention is a piezoelectric film of polyvinylidene fluoride, sold under the trademark Kynar by Atochem Sensors, Inc. (formerly Pennwalt Corp.). Specifically, an Atochem type DT1-028K/L Kynar sensor is attached to one side of the beam 28 using double-sided adhesive tape and its leads are connected to the circuit board 30. To minimize the overall length of the motion sensor, the beam 28 is mounted underneath and on one end of the printed circuit board 30. This assembly is then mounted within a housing 32 and covered by cover 32a (shown in FIG. 3). The housing 32 has flanges 34 and 36 for attachment within the EOT unit. Flexible leads 38 (shown in FIG. 2) are attached at one end to the printed circuit board 30 and terminate at the other end in a connector 40 used to connect the motion sensor to the microprocessor 12.

Figure 4:
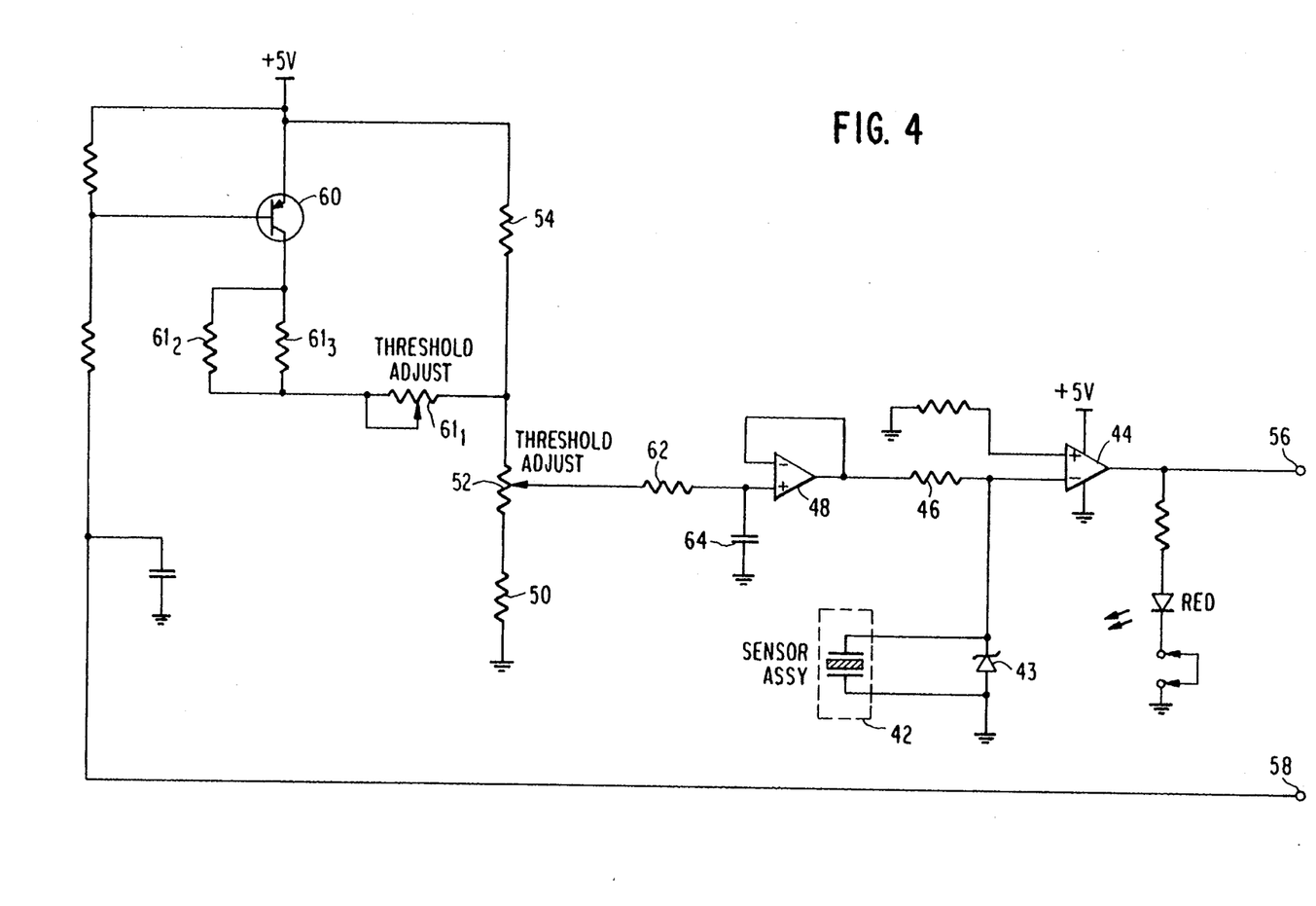
FIG. 4 is a schematic circuit diagram of the motion sensor electronics.

Referring next to FIG. 4, the output of the Kynar piezoelectric sensor assembly 42, comprising the beam 28 and the attached Kynar film shown in FIGS. 2 and 3, is connected across Schottky diode 43 and to the inverting input of operational amplifier 44 operating as a high gain comparator. The operational amplifier 44 has an adjustable input in parallel with the sensor assembly 42 through resistor 46 and a voltage buffer amplifier 48. Amplifier 48 derives its input from voltage divider comprising resistor 50, potentiometer 52 and resistor 54. Adjusting potentiometer 52 sets the minimum threshold level to which the entire motion sensor will respond. Vibration forces coupled to the resonant beam 28 which produce a sensor signal voltage less than the threshold setting are ignored, while signals above the threshold toggle the comparator 44 and produce output pulse transitions at terminal 56. These output pulses are read by microprocessor 12 which monitors edge transitions by executing the algorithm described with reference to FIGS. 9A, 9B and 9C.

Since vibration forces vary widely depending on train motion, a means of optimizing the threshold level is desirable. This is accomplished by feedback from the microprocessor 12 which applies a variable duty-cycled on-off signal to terminal 58. The duty-cycled signal can have one of eight values and acts to control PNP transistor switch 60. The transistor switch 60, when conducting, places resistor network $61_1$, $61_2$ and $61_3$ in parallel with resistor 54 thereby increasing the comparator threshold voltage. Resistor 62, connected to the wiper of potentiometer 52, and capacitor 64 form a low pass RC filter which removes the duty-cycled ripple signal from the threshold voltage. This duty-cycled threshold control signal may vary through some or all of its eight states based on the results of the microprocessor 12 executing the motion sensing algorithm. If vibration levels are high, many output transitions will occur, and the comparator threshold will be increased accordingly.

Figures 5, 5A:
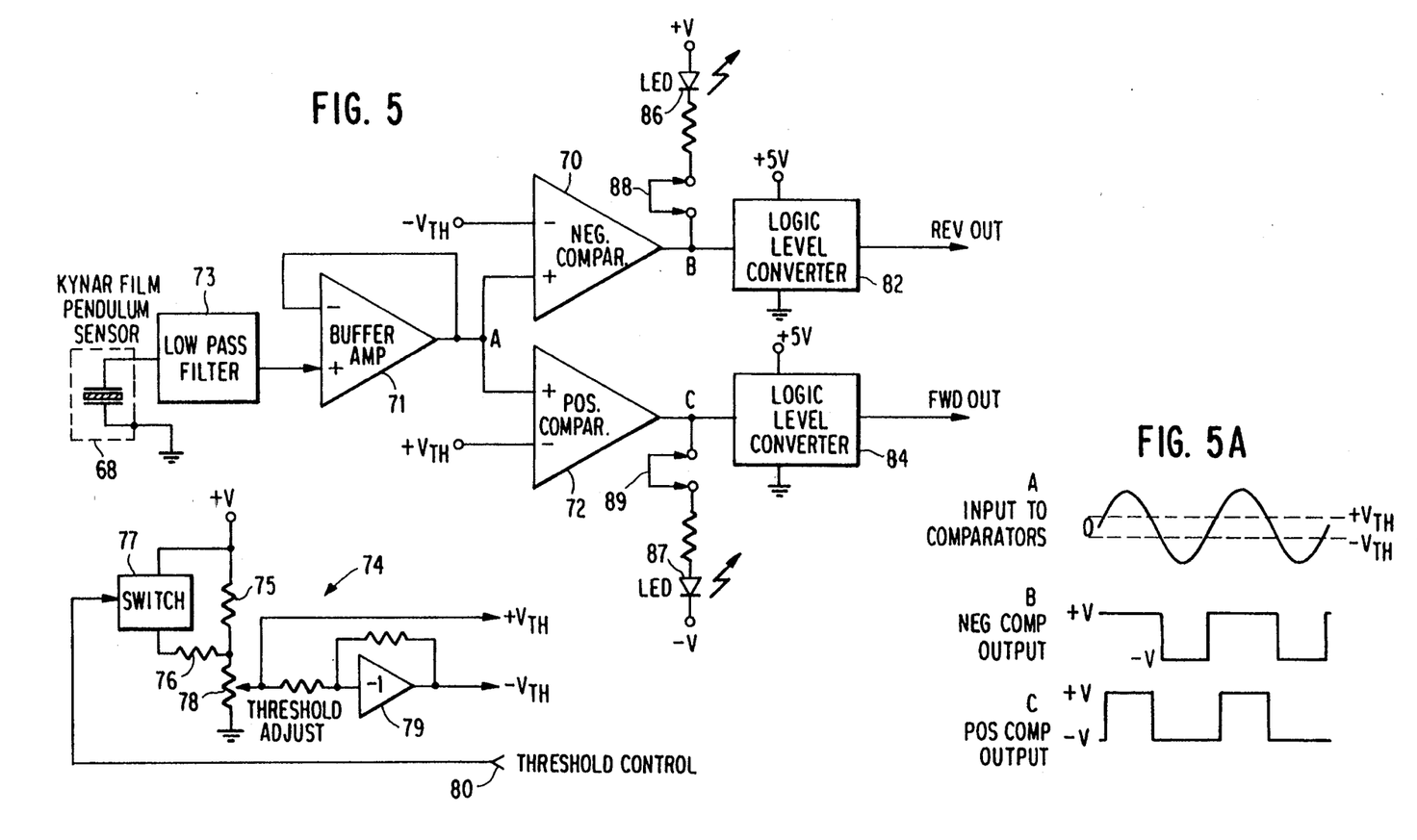
FIG. 5 is a block diagram showing the principal components of the direction sensor according to the invention.
FIG. 5A are timing diagrams illustrating the operation of the circuit shown in FIG. 5.

FIG. 5 shows a block diagram of the principal components of the direction sensor 22. In order to detect the direction of train motion, a pendulum sensor 68 using Kynar piezoelectric film was devised. The pendulum sensor 68 is suspended vertically within the EOT with its swing axis aligned with the direction of train motion. As shown in more detail in FIGS. 6 and 7, the pendulum itself consists of two weights each attached to one side of the piezoelectric film. The film is oriented in a known manner, and then supported and clamped across the active area near its top, so that when the pendulum swings, the film is stressed and generates an electrical output signal.

The basic underlying principle of the direction sensor is that when the pendulum swings in a given direction, the polarity of the first half cycle of the sensor's output voltage has one sense, say positive, and when the pendulum swings in the opposite direction, the polarity of the first half cycle is then negative. This effect occurs because, during the manufacture of the Kynar piezoelectric film, the normal process of poling provides a permanent orientation of the molecular dipoles within the Kynar material. Of course, the pendulum reacts inversely to train motion, moving backward for forward motion, and vice versa.

In the block diagram of FIG. 5, the output voltage of the Kynar pendulum sensor 68 is first filtered by low pass filter 73 and then buffered by amplifier 71 before being applied simultaneously to the inputs of the two comparators 70 and 72. The negative comparator 70 is biased with a negative threshold voltage $-V_{th}$, and the positive comparator 72 is biased with an equal but positive threshold voltage $+V_{th}$, both generated by threshold circuit 74. The threshold circuit 74 comprises a switchable voltage divider composed of resistors 75 and 76, switch 77 and potentiometer 78. The output of the potentiometer 78 is the positive threshold voltage $+V_{th}$ supplied to comparator 72. The negative threshold voltage $-V_{th}$ to comparator 70 is generated by inverting amplifier 79. The threshold is adjusted by potentiometer 78. The threshold can also be independently increased under software control to make the sensor less sensitive by having the microprocessor 12 ground terminal 80.

By monitoring the outputs of the comparators 70 and 72, it is possible to determine pendulum swing direction by measuring which comparator changed state first. As illustrated in FIG. 5A, the signal input to the comparators is denoted by the letter A, and the output signals of the comparators 70 and 72 are denoted by the letters B and C, respectively. As shown in FIG. 5A, an output pulse from the positive comparator 72 occurs before an output pulse from the negative comparator 70. This corresponds to forward motion. Conversely, if an output pulse from the negative comparator 70 had occurred before an output pulse from the positive comparator 72, then reverse motion has occurred.

The light emitting diodes (LEDs) 86 and 87 connected by jumpers 88 and 89 to the outputs, respectively, of comparators 70 and 72 are used for initial test purposes only. The comparator output signals are level shifted by logic level converters 82 and 84 to TTL compatible signals for further processing by the microprocessor 12. In executing its direction sensing algorithm, the essential initial determination the microprocessor makes is the time sequence of the pulses on the FWD OUT and REV OUT output lines. Additional processing serves to validate that the output pulses occurred from the start of real train motion and are not artifacts or false direction signals.

Figure 6:
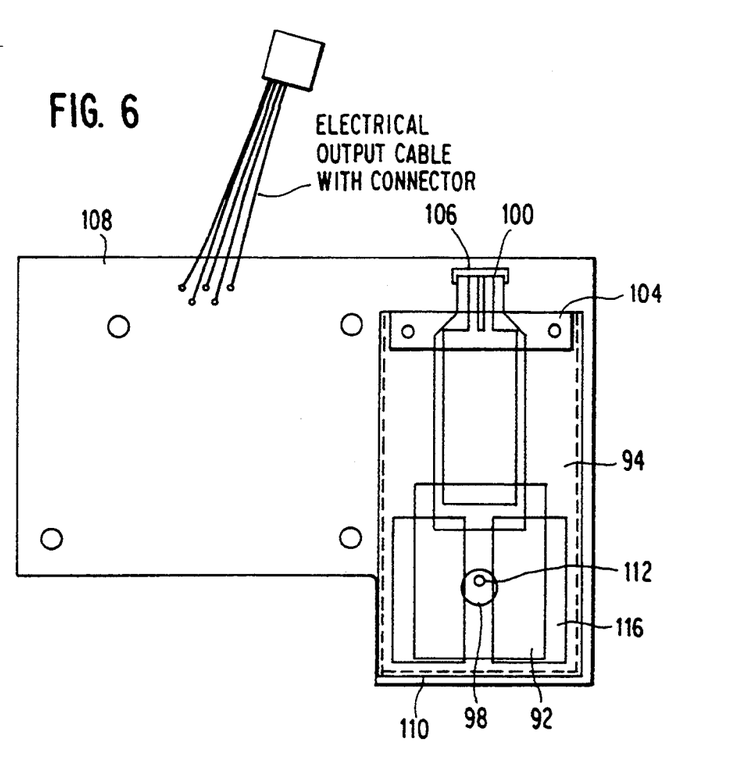
FIG. 6 is a front view, with the enclosure partially cut away, of the direction sensor according to the invention.
Figure 7:
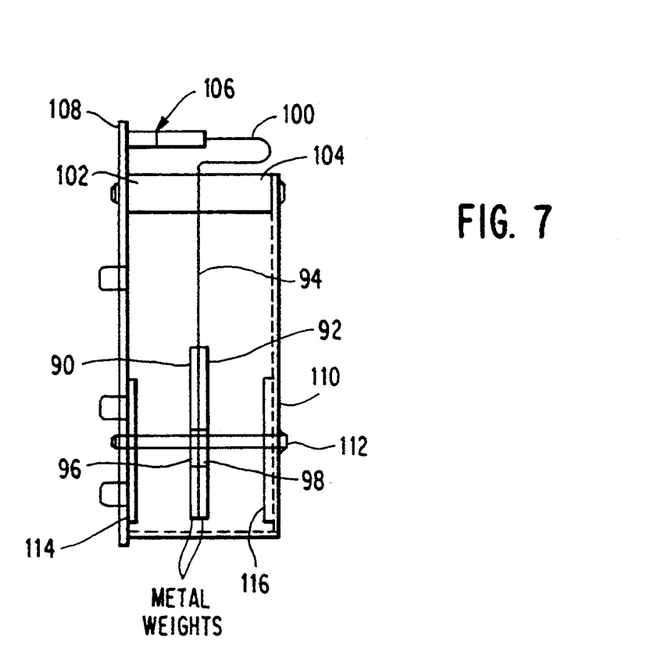
FIG. 7 is a side view, partially in section, of the direction sensor according to the invention.

FIGS. 6 and 7 show the mechanical design of the direction sensor. A standard Atochem Kynar sensor, type FLDT1-028K, is used. A pair of identical weights 90 and 92 are attached to the Kynar film 94 end of the sensor using cyanoacrylate adhesive, one weight on each side. These weights are each made with an oversized hole 96 and 98, respectively, near the bottom end. The upper end of the sensor, where the flexible leads 100 are attached, is clamped between a pair of support blocks 102 and 104, one metal and one plastic. The Mylar film side of the sensor is positioned against the metal block. Note that the clamping blocks straddle the transition zone between the active Kynar film and the lead attachments, so that when the pendulum moves, the Kynar film is stressed and generates an output voltage. The flexible leads 100 terminate in a connector 106 which is soldered to a printed circuit board 108 on which are mounted the signal conditioning electronics for the direction sensor.

As shown, these sensor components are also directly mounted on the printed circuit board 108 with the signal conditioning electronics and are covered by a grounded metal housing 110 which, together with the printed circuit board ground plane, provide a Faraday shield around the high impedance sensor. In addition, a metal pin 112 protruding from the housing 110 is positioned to pass through the oversize holes 96 and 98 in the pendulum weights 90 and 92, respectively, and engage a hole in the printed circuit board 108. The purpose of this pin 112 is to provide a containment mechanism to secure the pendulum from excessive mechanical excursions due to violent shocks it may receive and yet allow it to swing unimpeded in normal operation. Finally, two foam tape stops 114 and 116 are placed, one on the printed circuit board and one in the cover, to act as bumpers for the weights, if the pendulum swing becomes excessive for any reason.

Figure 8:
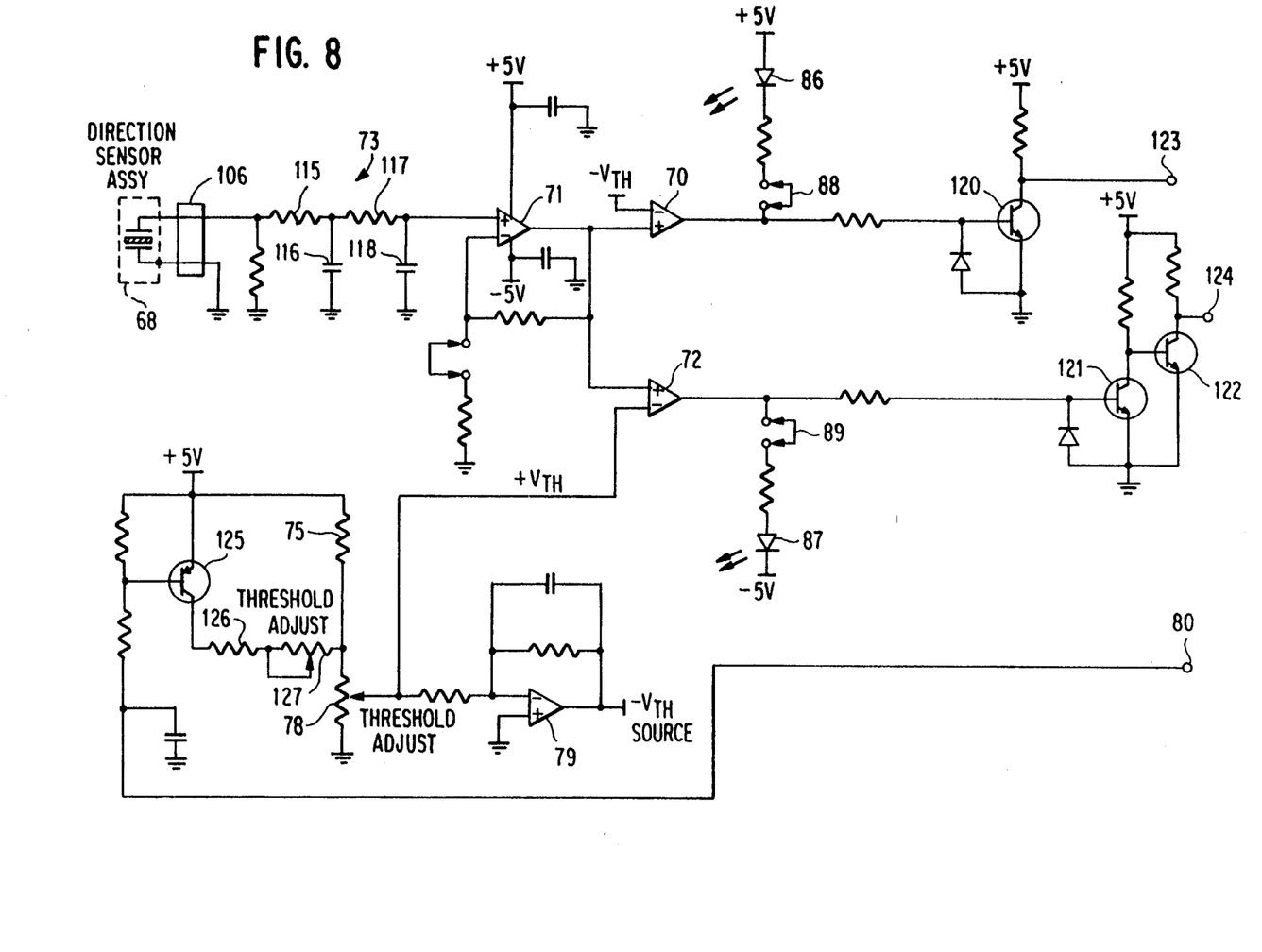
FIG. 8 is a schematic circuit of the direction sensor electronics.

Referring now to FIG. 8, the circuitry for the direction sensor operates as follows. The output voltage of the pendulum sensor assembly 68 is filtered by a two section low pass RC filter 73 composed of resistor 115, capacitor 116, resistor 117, and capacitor 118 and applied to the buffer amplifier 71. The filter 73 has a nominal cut-off frequency of 33 Hz and attenuates signal frequencies which are high compared to the pendulum frequency of approximately 3.3 Hz. These higher frequency signals are artifacts which are generated when the Kynar film of the sensor responds to forces not related to the swinging of the pendulum. For example, vertical cross-axis shock forces are greatly reduced in this manner.

Operational amplifiers 70 and 72 are connected as high gain comparators biased by equal but opposite polarity threshold voltages, $-V_{th}$ and $+V_{th}$, respectively. The comparator outputs are level shifted by NPN transistors 120 and 121, respectively, and the output of transistor 121 is further inverted by NPN transistor 122. The resulting digital outputs at terminals 123 and 124 are normally low with the pendulum at rest and go high when the comparator threshold voltage is exceeded by a pendulum signal of either polarity. The microprocessor 12 monitors these two direction signal output lines for low to high transitions and, by measuring the time sequence of these transitions, can determine initial pendulum swing direction which, as mentioned above, is opposite to the direction of train movement. The details of the direction algorithm executed by the microprocessor are described below.

The remaining circuit components function as follows. When jumpers 88 and 89 are installed, they permit LEDs 86 and 87 to alternately flash as the pendulum swings. These LEDs are useful during system adjustment but are not used in normal operation in order to conserve battery power. The voltage divider formed by resistor 75 and potentiometer 78 and the inverter 79 generate the complementary threshold voltages for the two comparators 70 and 72. Potentiometer 78 is used to set the initial value of the threshold voltage, while PNP transistor 125, operating as switch 77, and resistors 126 and 127 permit the threshold voltage to be increased by a fixed amount under microprocessor control to adjust sensitivity if required.

As noted above, both the motion and direction sensors output electrical pulses which are processed by the microprocessor 12 executing special algorithms. These algorithms determine if actual motion and direction signal changes have occurred. Part of this determination process is designed to discriminate against various artifacts which are generated by the sensors in addition to their desired outputs.

Figure 9A:
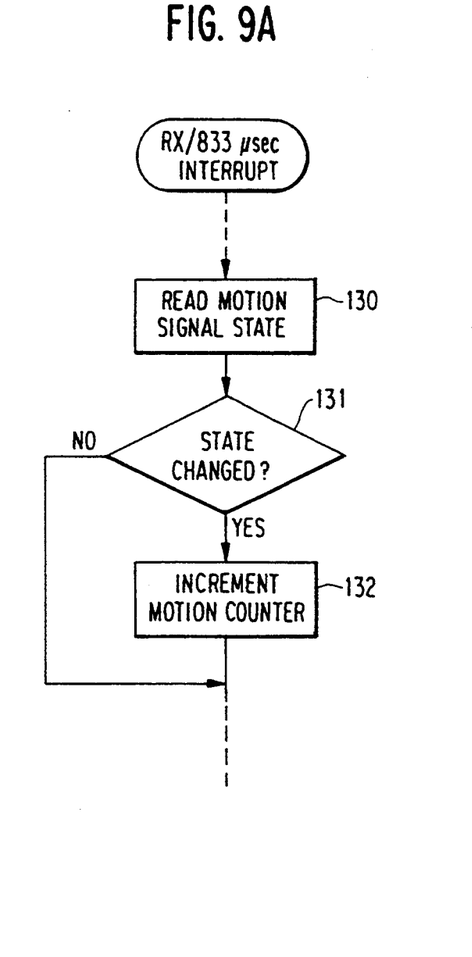
FIGS. 9A, 9B and 9C, taken together, are a flow chart illustrating the logic of the motion sensing algorithm implemented by the EOT microprocessor.
Figure 9B:
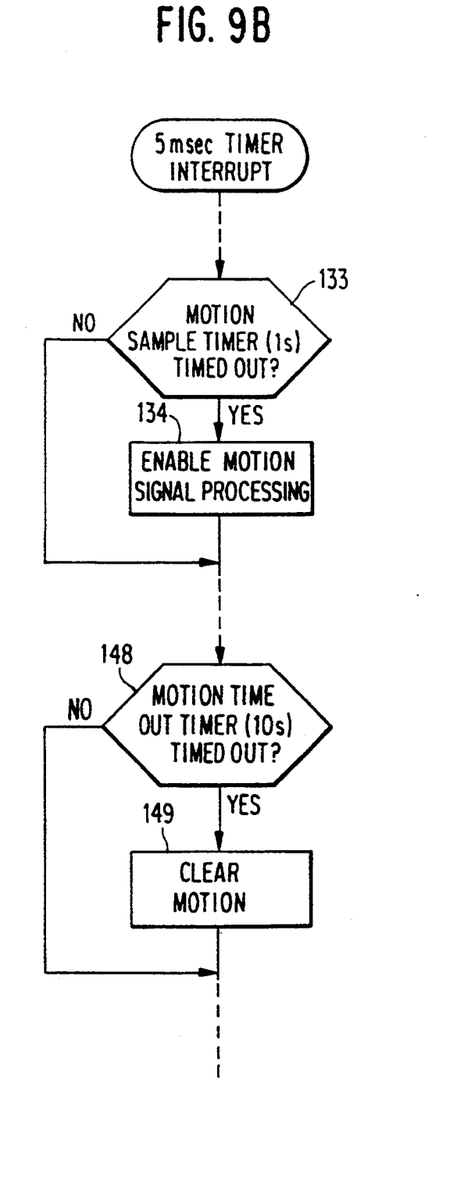
Figure 9C:
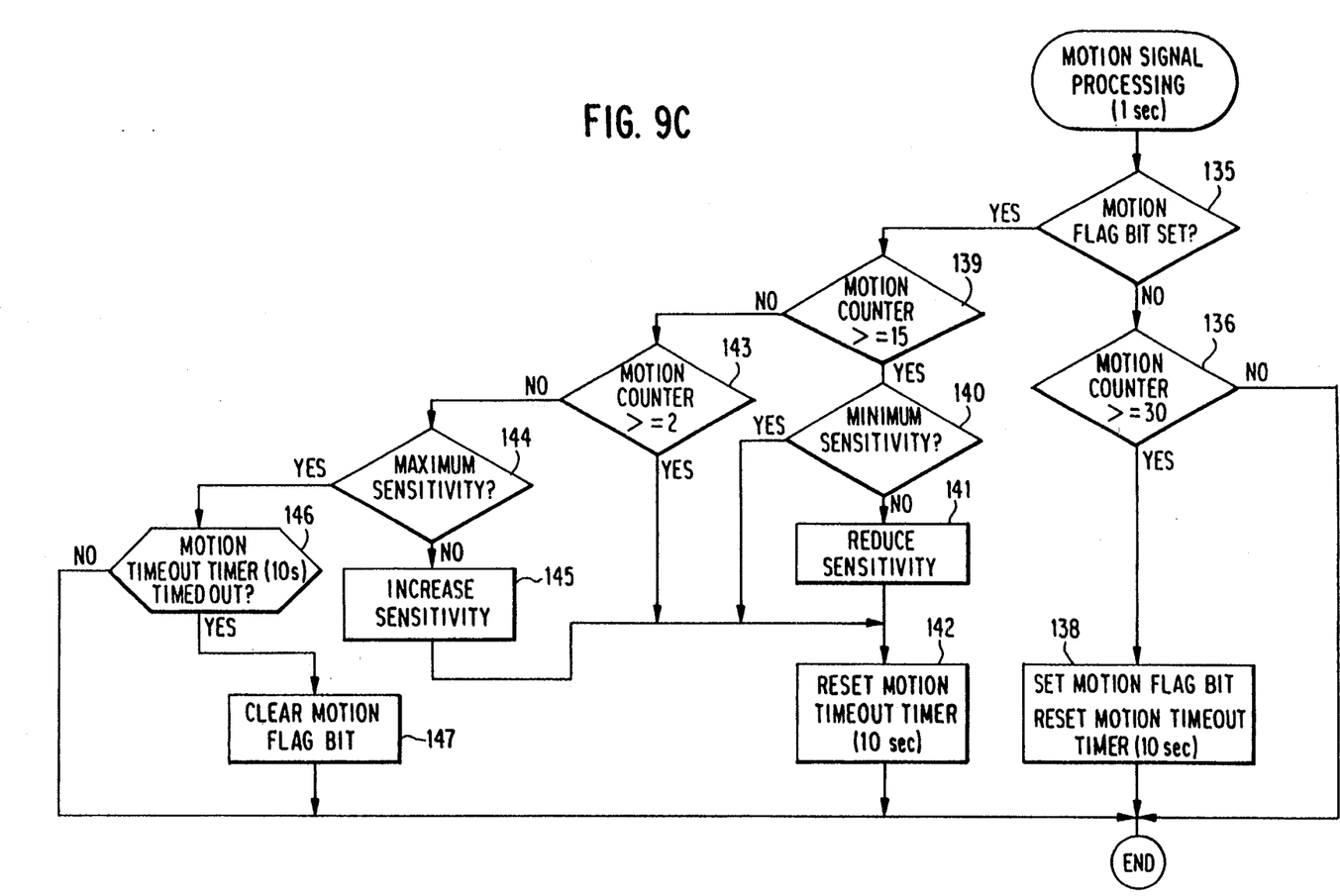

FIGS. 9A, 9B and 9C, taken together, are a flow chart illustrating the logic of the motion sensing algorithm implemented by the microprocessor. As will be shown, at rest with no vertical vibration input, the microprocessor sets the motion sensor to its most sensitive condition (lowest threshold voltage applied).

Referring now to FIG. 9A, the motion sensor output signal (at terminal 56 in FIG. 4) is sampled every 833 μsecs. for a period of 1.0 seconds, providing 1200 samples per period, as indicated by function block 130. Motion vibration is detected in decision block 131 by comparing current sensor state with previous sensor state. A motion counter is incremented in function block 132 for every transition (high to low or low to high) of the output signal. In FIG. 9B, when the one second motion sample timer in decision block 133 times out, 1200 samples of the motion output signal have been processed, and the motion signal processing code is enabled and executed in function block 134. The motion signal processing is shown in FIG. 9C, to which reference is now made.

In FIG. 9C, the status of the motion flag bit is checked in decision block 135. If the motion flag bit is not set, the motion counter is checked in decision block 136 to determine its count. If the motion counter has stored thirty or more transitions, the motion flag bit is set, a ten second motion timeout timer is started, and motion counter is reset to zero in function block 138.

If the motion flag bit was already set, then the motion counter is checked in decision block 139 to determine if its count is fifteen or greater. If it is, then a further test is made in decision block 140 to determine if the motion sensor sensitivity is at the minimum level; i.e., that the duty cycle of the on-off control signal applied at terminal 58 shown in FIG. 4 is at the highest of its eight discrete values. If not, motion sensor sensitivity is decreased in function block 141 by one level. After the sensitivity reduction, or if the sensitivity was already at minimum, then the ten second motion timeout timer is reset to ten seconds in function block 142. If, however, the contents of the motion counter were less than fifteen but two or more, as determined in decision block 143, the motion sensor is operating at optimum sensitivity, and the ten second motion timeout timer is simply reset to ten seconds in function block 142.

If, however, it is determined in decision block 143 that the contents of the motion counter are less than two transitions, then the sensitivity of the motion sensor is checked in decision block 144. If not already at maximum sensitivity, the sensitivity is increased one level in function block 145. The ten second motion timeout timer is reset to ten seconds in function block 142 and the motion flag bit remains set true. Alternatively, if it was determined in decision block 144 that the motion sensor was operating at maximum sensitivity, then the ten second motion timeout timer is checked in decision block 146. If this timer has timed out, then the motion flag bit is cleared in function block 147 indicating the absence of motion. The motion sensor remains set at its maximum sensitivity. The indication that "motion is absent" means that ten sequential sampling intervals one second apart each contained less than two motions signal transitions.

Finally, the ten second motion timeout timer is also checked in decision block 148 of FIG. 9B independently of the motion signal processing loop. If for any other reason this timer times out, then the motion flag bit is also cleared in function block 149.

Figure 10A:
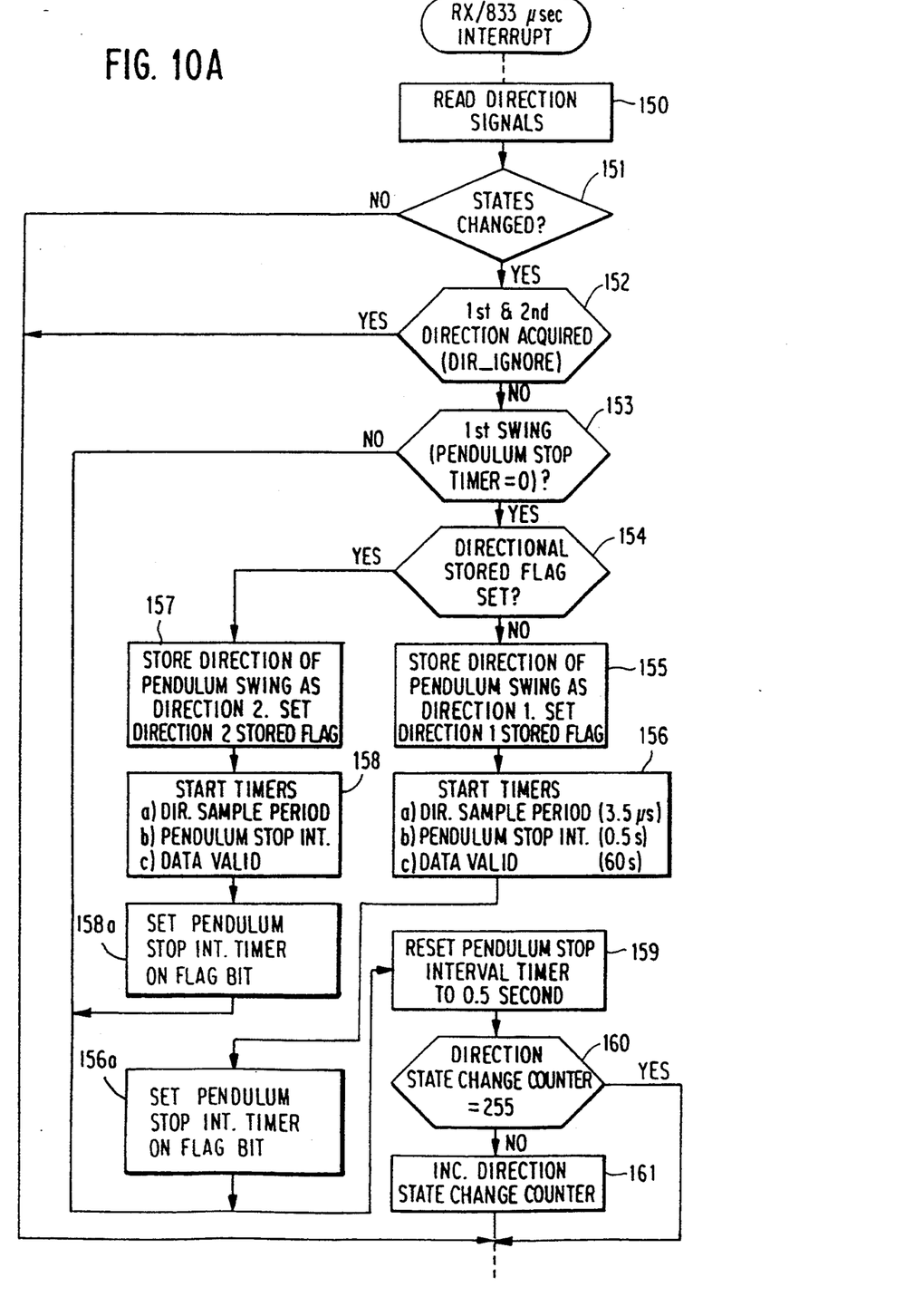
FIGS. 10A, 10B and 10C, taken together, are a flow chart illustrating the logic of the direction sensing algorithm implemented by the EOT microprocessor.
Figures 10B, 10C:
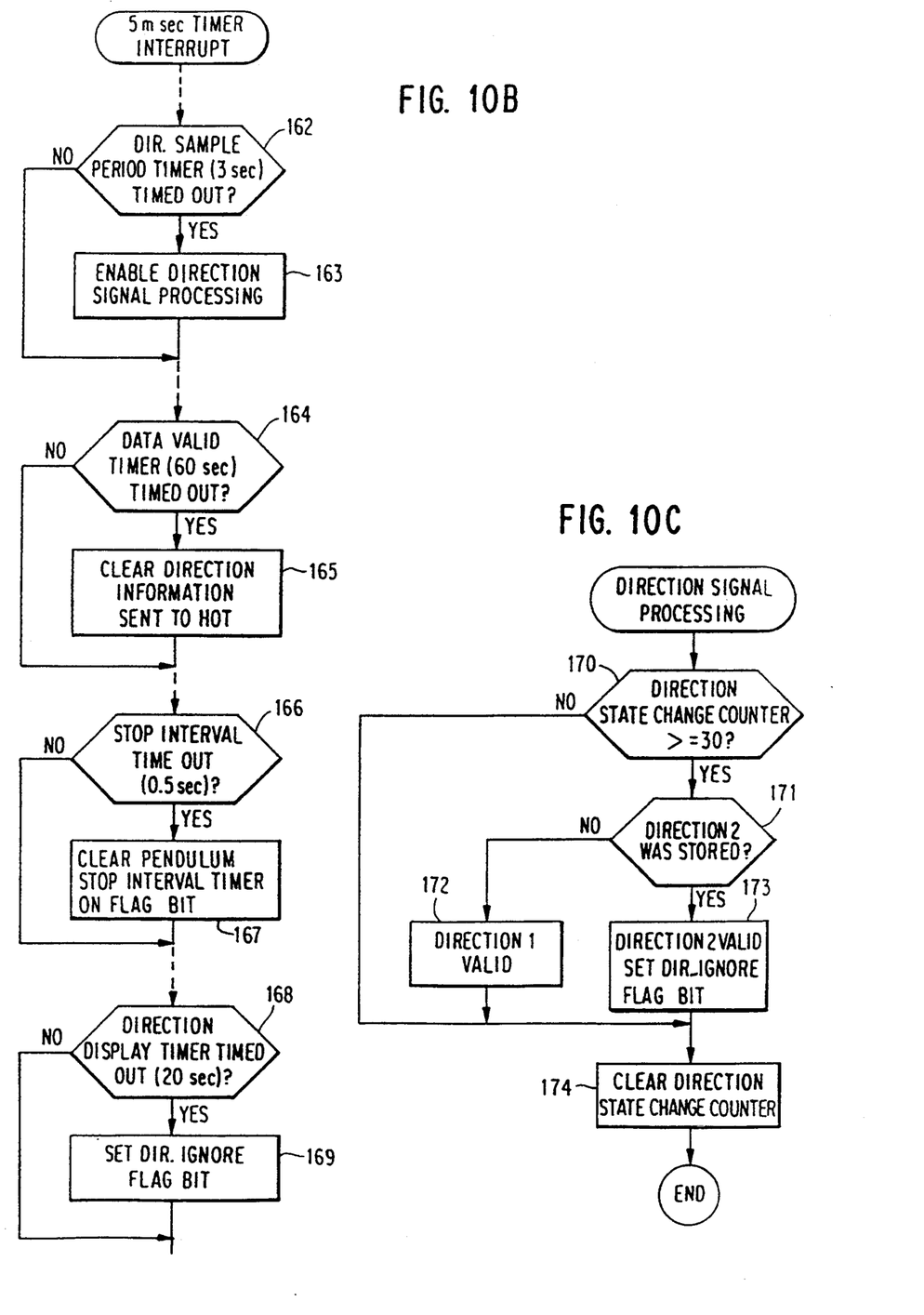

FIGS. 10A, 10B and 10C, taken together, are a flow chart illustrating the logic of the direction sensing algorithm implemented by the microprocessor 12. While direction detection is independent of the motion detection, the qualification and transmission of direction information by the EOT unit is conditional on the detection of motion by the motion detector.

Referring first to FIG. 10A, the two direction signal lines (terminals 121 and 123 shown in FIG. 8) are sampled every 833 μsecs. in function block 150. Presence of direction information is detected in decision block 151 by comparing current signal states with previously sampled signal states. In addition, first signal change on these two direction lines is also determined as this indicates the direction of train motion, as described previously. If the state of both direction output lines has not thronged, the remaining logic of FIG. 10A is skipped. If the signal state of either line has changed, the direction ignore (DIR_IGNORE) flag bit is checked in decision block 152. If it is set, then first and second direction signal indications have previously been acquired, and the remaining logic of FIG. 10A is bypassed.

If the direction ignore flag bit is cleared (i.e., not set), then either no previous or one previous direction signal indication has been stored, and control passes to decision block 153 where the pendulum stop interval timer on flag bit is checked. If this flag bit is not set, then the signal state change which occurred resulted from a swing of the pendulum from its rest position, and control passes to decision block 154 where the direction "1" stored flag bit is checked. If the direction "1" stored flag bit is not set, then the direction of the train motion (forward or reverse) corresponding to the direction of the pendulum swing is stored in function block 155 as direction "1", and the direction "1" stored flag is then set.

Processing continues in function block 156 as the three second direction sample period timer, the 0.5 second pendulum stop interval timer, and the sixty second data valid interval timer are all started. Each of these timers serves a specific purpose as follows. The three second direction sample period timer sets the interval during which pendulum motion is qualified to determine if train motion has occurred. The 0.5 second pendulum stop interval timer sets the minimum time that the pendulum must be at rest (i.e., not swinging) before any subsequent swing is considered to be a first swing. The sixty second data valid interval timer sets the maximum time that acquired direction information is considered valid for transmission to the HOT unit. After this, in function block 156a, the pendulum stop interval timer on flag bit is set.

If, in decision block 154, the direction "1" stored flag had been set, then in function block 157, the direction of train motion (forward or reverse) corresponding to the direction of the pendulum swing is stored as direction "2", and the direction "2" stored flag is set. Next, the same three timers as described above are all started, from function block 158, and the pendulum stop interval timer on flag bit is set in function block 158a. Note, however, that a second direction indication will not be stored if more than twenty seconds have elapsed since a first direction indication was stored. As will be explained below, this is controlled by checking the twenty second direction display timer in decision block 168 in FIG. 10B. If this timer has timed out, the direction ignore flag bit will be set, which will prevent the acquisition of a second direction indication. The twenty second direction display timer is started based on a determination of valid motion by the motion detector. In this manner, the operation of the direction sensor is enhanced by feedback from the motion sensor.

Referring again to FIG. 10A, program flow continues at function block 159 where the 0.5 second pendulum stop interval timer is reset to 0.5 seconds. Next, in decision block 160, the accumulated count of the direction state change counter is checked. If the counter has not reached 255 counts, it is incremented. If it has reached its full count of 255, nothing is done.

Referring now to FIG. 10B, program flow continues at decision block 162 which checks the three second direction sample period timer. If the timer has timed out, then direction signal processing is enabled in function block 163, which is detailed in FIG. 10C. First, the count of the direction state change counter is checked. If this count is equal to or greater than thirty, then decision block 171 checks to see if a direction "2" indication was stored. If no direction "2" indication was stored, then direction "1" is validated in function block 172, and the direction state change counter is cleared in function block 174. If, however, a direction "2" indication was stored, the direction "2" indication is declared valid and the direction ignore flag bit is set, both in function block 173. Then, as above, function block 174 is entered to clear the direction state change counter.

Referring again to FIG. 10B, if the three second direction sample period timer has not timed out, direction signal processing is bypassed, and other software not related to the direction algorithm is executed before processing resumes at decision block 164. In block 164, the sixty second data valid timer is checked. If this timer has timed out, the direction information transmitted to the HOT unit is cleared in function block 165. If this timer has not timed out, then function block 165 is bypassed and other non-related software is executed before processing resumes at decision block 166. In decision block 166, the pendulum stop interval timer is checked. If this timer has timed out, the pendulum stop interval timer on flag bit is cleared in function block 167; otherwise, function block 167 is bypassed and other non-related software is executed before processing resumes at decision block 168. In decision block 168, the twenty second direction display timer is checked. If this timer has timed out, then the direction ignore flag bit is set in function block 169; otherwise, nothing is done.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An improved motion sensor package mounted within end of train telemetry equipment, said end of train telemetry equipment including a microprocessor, said package comprising a motion sensor including a piezoelectric film on a cantilevered beam having a resonant frequency chosen for optimum detection of motion of a railroad car, said cantilevered beam being mounted at one end to a printed circuit board within a housing, said housing being mountable with said end of train telementry equipment, said motion sensor further including comparator means connected to said piezoelectric film for generating electrical pulses and threshold means having a control input for receiving a control signal, said printed circuit board having mounted thereon said comparator means, said threshold means being responsive to said control signal and providing an adjustable threshold voltage to said comparator means, said microprocessor receiving and processing said electrical pulses to detect motion.

2. An improved motion sensor package mounted within end of train telemetry equipment, said end of train telemetry equipment including a microprocessor, said package comprising a motion sensor including a piezoelectric film on a cantilevered beam having a resonant frequency chosen for optimum detection of motion of a railroad car, said motion sensor further including comparator means connected to said piezoelectric film for generating electrical pulses and threshold means having a control input for receiving a control signal, said threshold means being responsive to said control signal and providing an adjustable threshold voltage to said comparator means, said microprocessor receiving and processing said electrical pulses to detect motion and wherein said microprocessor generates said control signal that controls said threshold means for adjusting sensitivity of said motion sensor as a function of detected motion.

3. The improved motion sensor package recited in claim 2 wherein said microprocessor controls said threshold means by applying a variable duty cycled on-off control signal to said control input of said threshold means to vary the threshold voltage to said comparator means.

4. An improved direction of motion sensor package mounted within end of train telemetry equipment, said end of train telemetry equipment including a microprocessor, said package comprising a direction sensor including a piezoelectric film in a pendulum structure aligned with a direction of motion of a railroad car, said direction sensor further including first and second comparator means each connected to said piezoelectric film for generating first and second electrical pulses and threshold means having a control input for receiving a control signal, said threshold means being responsive to said control signal and providing controlled and opposite polarity threshold voltages to said first and second comparator means, said microprocessor receiving and processing said first and second electrical pulses to detect direction of motion.

5. The improved direction of motion sensor package recited in claim 4 wherein said pendulum structure comprises said piezoelectric film clamped between first and second blocks at one end and first and second weights secured to either side of said piezoelectric film at an opposite end to produce stress in said piezoelectric film at said one end as said first and second weights oscillate.

6. The improved direction of motion sensor package recited in claim 5 wherein said first and second weights have centrally located holes, said package further including a pin passing through said centrally located holes to contain the pendulum structure and prevent excessive mechanical excursions due to violent shocks.

7. The improved direction of motion sensor package recited in claim 6 wherein said first block is mounted to a printed circuit board on which are mounted said first and second comparator means and said threshold means and a cover is mounted to said second block, said printed circuit board and said cover enclosing said pendulum structure and said pin being attached to said cover and extending through a hole in said printed circuit board.

8. The improved direction of motion sensor package recited in claim 7 further comprising first and second bumper means attached respectively to an inside surface of said cover and an opposing surface of said printed circuit board at locations strikable by bottom edges of said first and second weights for absorbing energy from said pendulum structure if pendulum swing becomes excessive.

9. The improved direction of motion sensor package recited in claim 7 wherein said cover is metallic and said printed circuit board has a ground plane, said cover and said ground plane forming a Faraday shield for said pendulum structure.

10. An improved combination of a motion sensor package and a direction of motion sensor package mounted within end of train telemetry equipment, said end of train telemetry equipment including a microprocessor, said motion sensor package comprising a motion sensor including a first piezoelectric film on a cantilevered beam having a resonant frequency chosen for optimum detection of motion of a railroad car, said motion sensor further including first comparator means connected to said first piezoelectric film for generating first electrical pulses and first threshold means having a first control input for receiving a first control signal, said threshold means being responsive to said first control signal and providing an adjustable threshold voltage to said first comparator means, said microprocessor receiving and processing said first electrical pulses to detect motion, said microprocessor controlling said first threshold means for adjusting sensitivity of said motion sensor as a function of detected motion, said direction sensor package comprising a direction sensor including a second piezoelectric film in a pendulum structure aligned with a direction of motion of a railroad car, said direction sensor further including second and third comparator means each connected to said second piezoelectric film for generating second and third electrical pulses and second threshold means having a second control input for receiving a second control signal, said threshold means being responsive to said second control signal and providing controlled and opposite polarity threshold voltages to said second and third comparator means, said microprocessor receiving and processing said second and third electrical pulses to detect direction of motion.

11. The improved combination of a motion sensor package and a direction of motion sensor package recited in claim 10 wherein said microprocessor first determines motion has occurred before providing an output indicating direction of motion.

12. The improved combination of a motion sensor package and a direction of motion sensor package recited in claim 11 wherein said cantilevered beam is mounted at one end to a printed circuit board within a housing, said housing being mountable with said end of train telemetry equipment and said printed circuit board having mounted thereon said comparator means.

13. The improved combination of a motion sensor package and a direction of motion sensor package recited in claim 11 wherein said microprocessor generates said first control signal to control said first threshold means for adjusting sensitivity of said motion sensor as a function of detected motion.

14. The improved combination of a motion sensor package and a direction of motion sensor package recited in claim 13 wherein said microprocessor controls said first threshold means by applying a variable duty cycled on-off first control signal to said first control terminal of said threshold means to vary the threshold voltage to said first comparator means.

15. The improved combination of a motion sensor package and a direction of motion sensor package recited in claim 10 wherein said pendulum structure comprises said second piezoelectric film clamped between first and second blocks at one end and first and second weights secured to either side of said second piezoelectric film at an opposite end to produce stress in said second piezoelectric film at said one end as said first and second weights oscillate.

16. The improved combination of a motion sensor package and a direction of motion sensor package recited in claim 15 wherein said first and second weights have centrally located holes, said package further including a pin passing through said centrally located holes to contain the pendulum structure and prevent excessive mechanical excursions due to violent shocks.

17. The improved combination of a motion sensor package and a direction of motion sensor package recited in claim 16 wherein said first block is mounted to a printed circuit board on which are mounted said second and third comparator means and said second threshold means and a cover is mounted to said second block, said printed circuit board and said cover enclosing said pendulum structure and said pin being attached to said cover and extending through a hole in said printed circuit board.

18. The improved combination of a motion sensor package and a direction of motion sensor package recited in claim 17 further comprising first and second bumper means attached respectively to an inside surface of said cover and an opposing surface of said printed circuit board at locations strikable by bottom edges of said first and second weights for absorbing energy from said pendulum structure if pendulum swing becomes excessive.

19. The improved combination of a motion sensor package and a direction of motion sensor package recited in claim 17 wherein said cover is metallic and said printed circuit board has a ground plane, said cover and said ground plane forming a Faraday shield for said pendulum structure.

* * * * *